US012008799B2

(12) United States Patent
Hirayama et al.

(10) Patent No.: US 12,008,799 B2
(45) Date of Patent: Jun. 11, 2024

(54) CLASSIFICATION SYSTEM AND LEARNING SYSTEM

(71) Applicants: Kabushiki Kaisha Toshiba, Tokyo (JP); Toshiba Digital Solutions Corporation, Kawasaki (JP)

(72) Inventors: Tsuyoshi Hirayama, Kawaguchi (JP); Kenji Kobayashi, Tachikawa (JP); Krishna Rao Kakkirala, Bangalore (IN)

(73) Assignees: Kabushiki Kaisha Toshiba, Tokyo (JP); Toshiba Digital Solutions Corporation, Kawasaki (JP)

( * ) Notice: Subject to any disclaimer, the term of this patent is extended or adjusted under 35 U.S.C. 154(b) by 458 days.

(21) Appl. No.: 17/317,301

(22) Filed: May 11, 2021

(65) Prior Publication Data

US 2021/0357677 A1    Nov. 18, 2021

(30) Foreign Application Priority Data

May 14, 2020    (IN) .............................. 202011020392

(51) Int. Cl.
*G06V 10/764*    (2022.01)
*G06F 18/2431*    (2023.01)
(Continued)

(52) U.S. Cl.
CPC ........ *G06V 10/764* (2022.01); *G06F 18/2431* (2023.01); *G06N 3/048* (2023.01);
(Continued)

(58) Field of Classification Search
CPC .... G06V 10/764; G06V 10/454; G06V 10/82; G06V 10/774; G06V 10/759;
(Continued)

(56) References Cited

U.S. PATENT DOCUMENTS 9,928,448 B1 *  3/2018  Merler ................ G06F 18/2415
10,692,209 B2 *  6/2020  Sashida .................. G06N 3/045
(Continued)

FOREIGN PATENT DOCUMENTS

CN    107480690 A    12/2017
JP     5667004 B2    2/2015
(Continued)

OTHER PUBLICATIONS

Alex Krizhevsky, et al., "ImageNet Classification with Deep Convolutional Neural Networks", Communications of the ACM, vol. 60, No. 6, Jun. 2017, https://doi.org/10.1145/3065386, 8 pages.
(Continued)

*Primary Examiner* — Michael S Osinski
(74) *Attorney, Agent, or Firm* — Maier & Maier, PLLC

(57) ABSTRACT

A classification system according to an embodiment includes a score calculation unit, a determination unit, and a classification unit. The score calculation unit calculates respective scores of predetermined classes from input data. The determination unit determines whether the input data belongs to anyone of the classes based on the respective scores of the classes, which are calculated by the score calculation unit. The classification unit determines which one of the classes the input data belongs to, based on the calculated scores when the determination unit determines that the input data belongs to anyone of the classes and determines that the input data belongs to an unknown class that is other than the classes when the determination unit determines that the input data does not belong the classes.

6 Claims, 9 Drawing Sheets

(51) Int. Cl.
*G06N 3/048* (2023.01)
*G06N 3/08* (2023.01)
*G06N 20/20* (2019.01)
*G06V 10/44* (2022.01)

(52) U.S. Cl.
CPC ............... *G06N 3/08* (2013.01); *G06N 20/20* (2019.01); *G06V 10/454* (2022.01)

(58) Field of Classification Search
CPC ............ G06F 18/2431; G06F 18/2411; G06F 18/245; G06F 18/243; G06F 18/2415; G06F 18/24; G06F 18/2413; G06F 18/254; G06F 18/217; G06F 18/23; G06F 18/22; G06N 3/048; G06N 3/08; G06N 20/20; G06N 3/045; G06N 3/044; G06N 3/084; G06N 20/10; G06N 20/00
See application file for complete search history.

(56) References Cited

U.S. PATENT DOCUMENTS

| | | | | |
|---|---|---|---|---|
| 10,867,216 | B2* | 12/2020 | Skaff | G06V 20/00 |
| 11,790,275 | B2* | 10/2023 | Aguilar-Simon | G06V 10/761 |
| 11,829,848 | B2* | 11/2023 | Hu | G06F 18/214 |
| 2011/0106740 | A1* | 5/2011 | Yeatman | G16H 50/20 706/20 |
| 2011/0137841 | A1* | 6/2011 | Yuta | G16B 40/20 706/20 |
| 2013/0108180 | A1* | 5/2013 | Ohtani | G06F 18/2321 382/225 |
| 2015/0186793 | A1* | 7/2015 | Ioffe | G06N 20/00 706/12 |
| 2017/0039469 | A1* | 2/2017 | Majumdar | G06F 18/2411 |
| 2017/0140213 | A1* | 5/2017 | Brandt | G06V 40/173 |
| 2017/0193337 | A1* | 7/2017 | Kriegman | G06F 18/2415 |
| 2017/0270389 | A1* | 9/2017 | Skaff | G06V 10/764 |
| 2018/0330273 | A1* | 11/2018 | Hu | G06V 10/764 |
| 2019/0034557 | A1* | 1/2019 | Alsallakh | G06V 10/82 |
| 2019/0102678 | A1* | 4/2019 | Chang | G06F 17/18 |
| 2019/0392260 | A1* | 12/2019 | Pang | G06F 18/217 |
| 2020/0097757 | A1* | 3/2020 | Min | G06V 10/764 |
| 2020/0202168 | A1* | 6/2020 | Mao | G01S 7/417 |
| 2020/0302273 | A1* | 9/2020 | Chung | G06V 10/454 |
| 2020/0394557 | A1* | 12/2020 | Boult | G06F 16/285 |
| 2021/0224612 | A1* | 7/2021 | Pinheiro | G06V 10/82 |
| 2021/0264300 | A1* | 8/2021 | Staudinger | G06V 10/762 |

FOREIGN PATENT DOCUMENTS

| | | |
|---|---|---|
| JP | 2018528525 A | 9/2018 |
| JP | 2019-087181 A | 6/2019 |

OTHER PUBLICATIONS

Okamoto et al., "Hardware Design of Type Identifier based on Support Vector Machine for Computer-Aided Diagnosis of Colorectal Endoscopic Images", Research Institute for Nanodevice and Bio System (RNBS), Hiroshima University, The Institute of Electronics Information and Communication Engineers, Nov. 19, 2014, vol. 114, No. 329, 16 pages.

* cited by examiner

CLASSIFICATION SYSTEM AND LEARNING SYSTEM

FIELD

Embodiments of the present invention relate to a classification system, a program, and a learning system.

BACKGROUND

Technologies for classifying target data using models obtained through machine learning have been widely used. Classifiers that use models obtained through supervised learning classify data input to any one of classes defined as labeled training data used for machine learning. Therefore, even when data not corresponding to any defined class, the classifiers may classify the data to any class. Thus, when the data input to the classifiers does not correspond to any class defined as labeled training data, there is the problem that the input data is wrongly classified and classification precision deteriorates.

CITATION LIST

An example of Patent Document 1 is Japanese Unexamined Patent Application, First Publication No. 2019-087181.
An example of Non-Patent Document 1 is Alex Krizhevsky et al., "ImageNet Classification with Deep Convolutional Neural Networks", Communication of the ACM, May 2017, https://doi.org/10.1145/3065386.

SUMMARY

An objective of the present invention is to provide a classification system, a program, and a learning system capable of curbing deterioration in classification precision even when data not belonging to a predetermined class is included in a classification target.

According to an embodiment, a classification system includes a score calculation unit, a determination unit, and a classification unit. The score calculation unit calculates respective scores of predetermined classes from input data. The determination unit determines whether the input data belongs to anyone of the classes based on the respective scores of the classes, which are calculated by the score calculation unit. The classification unit determines which one of the classes the input data belongs to, based on the calculated scores when the determination unit determines that the input data belongs to anyone of the classes and determines that the input data belongs to an unknown class that is other than the classes when the determination unit determines that the input data does not belong the classes.

DETAILED DESCRIPTION

Figure 1:
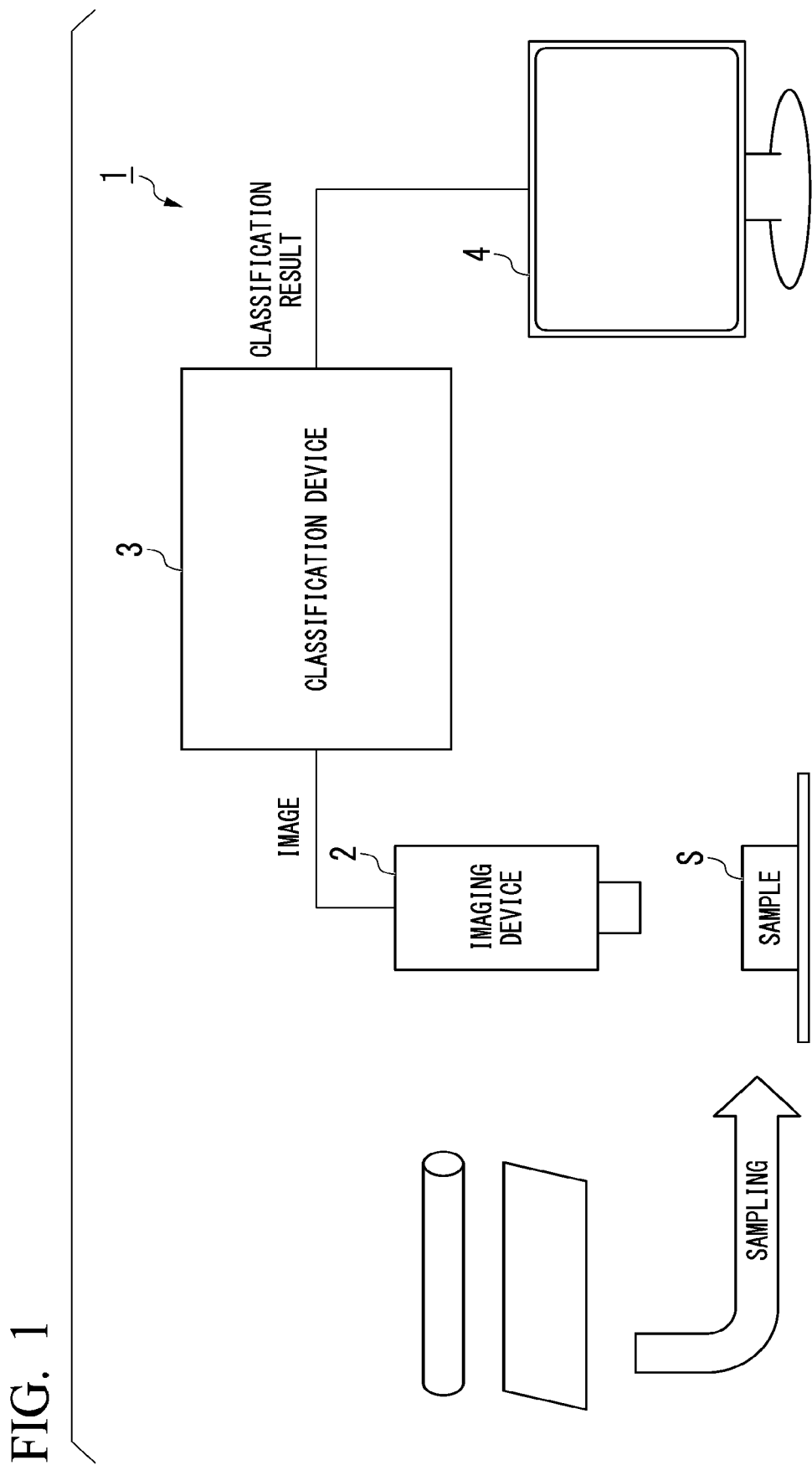
FIG. 1 is a diagram illustrating an example of a configuration of a classification system according to a first embodiment.

Hereinafter, a classification system, a program, and a learning system according to embodiments will be described with reference to the drawings. In the following embodiments, repeated description will be appropriately omitted on the assumption that configurations to which the same reference numerals are given perform the same operations.

A classification system according to first and second embodiments acquires a classification target image as input data and determines whether the classification target image belongs to an unknown class that is different from all of predetermined classes. When the classification system determines that the classification target image belongs to the unknown class, the classification system outputs a determination result indicating that the image belongs to an unknown class without classifying the image to any one of the predetermined classes. The classification system avoids wrong classification of images and curbs deterioration in classification precision by not determining that the images belonging to unknown classes belong to one of the predetermined classes. Hereinafter, examples to which the classification system is applied will be described.

First Embodiment

FIG. 1 is a diagram illustrating an example of a configuration of a classification system 1 according to the first embodiment. The classification system 1 determines whether the quality of a steel material formed into a plate, a rod, a tube, and the like belongs to one of the predetermined quality grades and classifies the quality of the steel material. The quality grade according to the first embodiment is an example of a class. As the quality grade, a standard decided by a standardization organization or a standard decided by a business group is used. For example, one of the standards decided with Japan Industrial Standards (JIS) is "JIS G0551 Steels-Micrographic determination of the apparent grain size." In this standard, the quality grade is classified into 22 grades. The grades are expressed as numbers of −1, 0, 0.5, 1.0, 1.5, 2.0, . . . , 9.0, 9.5, 10.0.

The classification system 1 includes an imaging device 2, a classification device 3, and a display device 4. The imaging device 2 images a classification target steel material or a sample S extracted from the steel material and supplies the obtained image as input data to the classification device 3. The imaging device 2 images the surface or cross section of the steel material or the sample S. A camera mounted on an optical microscope may be used as the imaging device 2. The classification device 3 determines whether a classification target steel material belongs to one of predetermined quality grades by using a model obtained through machine learning and classifies a quality of the steel material. The classification device 3 outputs a classification result indicating a quality grade of the classification target steel material to the display device 4 and causes the display device 4 to display the classification result. When the classification target steel material does not belong to any of the predetermined quality grades, the classification device 3 outputs a classification result indicating that the classification target steel material belongs to an unknown quality grade to the display device 4.

The quality grade is determined at the time of training a model. A training data set used to train the model includes a plurality of images obtained by imaging steel materials and a label indicating a quality grade corresponding to each image. That is, the training data set includes a plurality of combinations of the images and the labels. The quality grades indicated by the labels included in the training data set are quality grades obtained as a result of classification. The number of kinds of labels included in the training data set is the number of quality grades classified by the classification system 1. Hereinafter, a case in which the classification system 1 according to the first embodiment classifies whether a classification target steel material belongs to one of N kinds of quality grades will be described. The learning system used to train the model will be described after a classification process by the classification system 1 is described.

Figure 2:
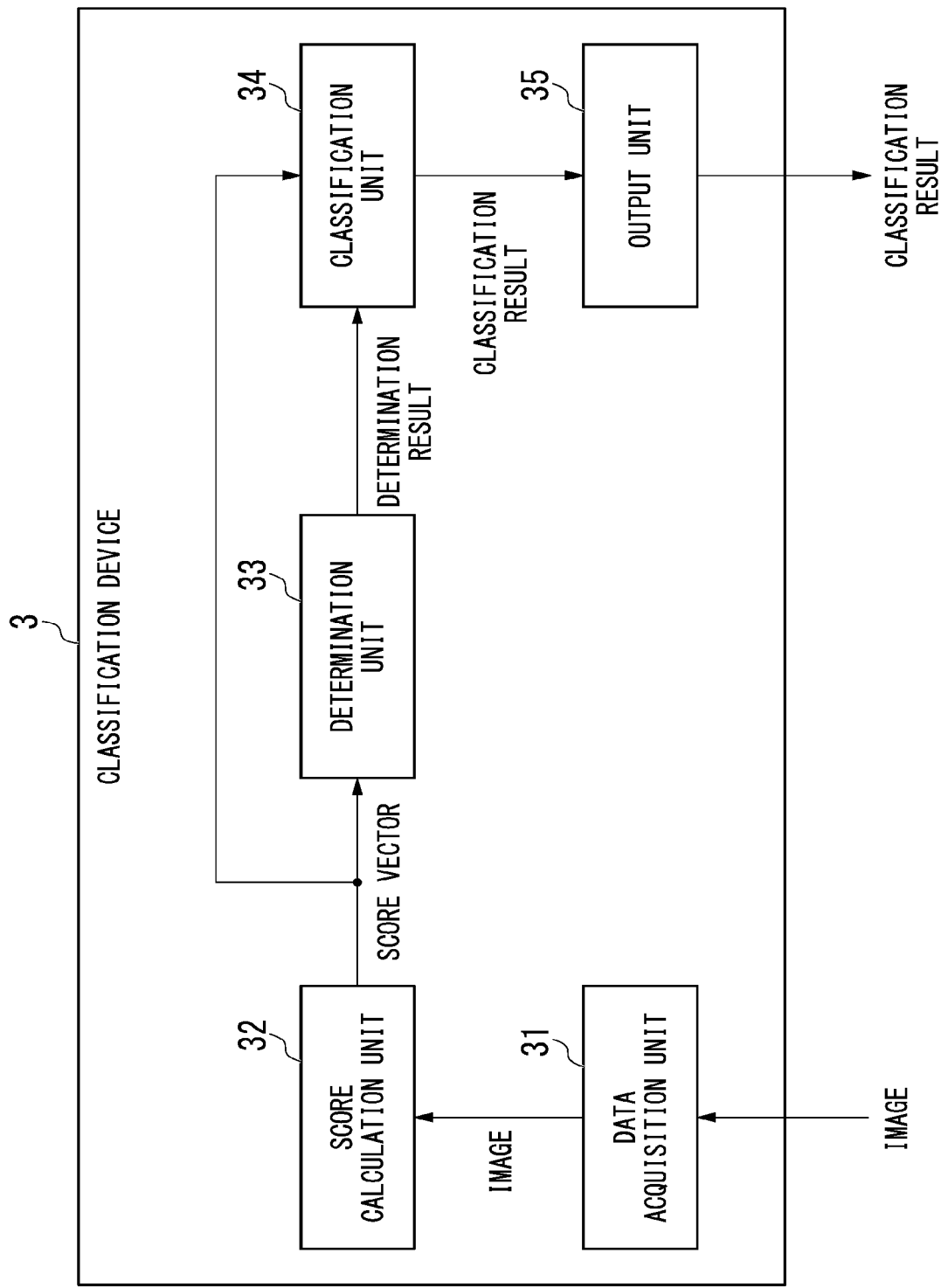
FIG. 2 is a block diagram illustrating an example of a configuration of a classification device according to the first embodiment.

FIG. 2 is a block diagram illustrating an example of a configuration of the classification device 3 according to the first embodiment. The classification device 3 includes a data acquisition unit 31, a score calculation unit 32, a determination unit 33, a classification unit 34, and an output unit 35. The data acquisition unit 31 receives an image of a steel material captured by the imaging device 2 and supplies the image to the score calculation unit 32. The score calculation unit 32 calculates a score vector from the image and supplies the calculate score vector to the determination unit 33 and the classification unit 34. The determination unit 33 determines whether the image obtained by imaging the steel material belongs to one of the predetermined quality grades by using the score vector and supplies a determination result to the classification unit 34. The classification unit 34 classifies the steel material indicated by the image based on the score vector and the determination result and supplies a classification result to the output unit 35. The output unit 35 outputs the classification result to the display device 4 and causes the display device 4 to display the classification result. For example, a size of the image obtained by imaging the steel material is 512×512 pixels and each pixel has a value (a value from 0 to 255) corresponding to each of red, green, and blue. Alternatively, the image size may be represented by W×H×C, where W represents width, H represents height, and C represents the number of channels, and color model may be represented by RGB, grayscale, HSV, or the like.

The score vector has the same number of elements as the number of quality grades. The element corresponding to each quality grade indicates the degree that the steel material indicated by the image belongs to the quality grade corresponding to the element. The determination result indicates whether the steel material indicated by the image belongs to one of the predetermined quality grades. The classification result shows the quality grade to which the steel material indicated by the image belongs or shows that the steel material indicated by the image does not belong to any quality grade. For example, a vector [1.1, 0.2, . . . , −1.5] is calculated as a certainty vector. A vector [0.1335, 0.5465, . . . , 0.6663] or [0.75, 0.55, . . . , 0.18] is calculated as a score vector.

The classification device 3 may function a computer that includes a central processing unit (CPU), a graphics processing unit (GPU), a temporary storage memory, and a storage device connected via a bus as the data acquisition unit 31, the score calculation unit 32, the determination unit 33, the classification unit 34, and the output unit 35. The CPU or the GPU may perform operations performed by the data acquisition unit 31, the score calculation unit 32, the determination unit 33, the classification unit 34, and the output unit 35 by executing program components stored in the storage device. The CPU or the GPU may perform some or all of the operations performed by the classification device 3 by executing program components stored in the storage device. Some or all of the operations performed by the classification device 3 may be realized as electronic circuits using hardware such as an application specific integrated circuit (ASIC), a programmable logic device (PLD), or a field programmable gate array (FPGA). The program may be stored in a computer-readable non-transitory recording medium.

Figure 3:
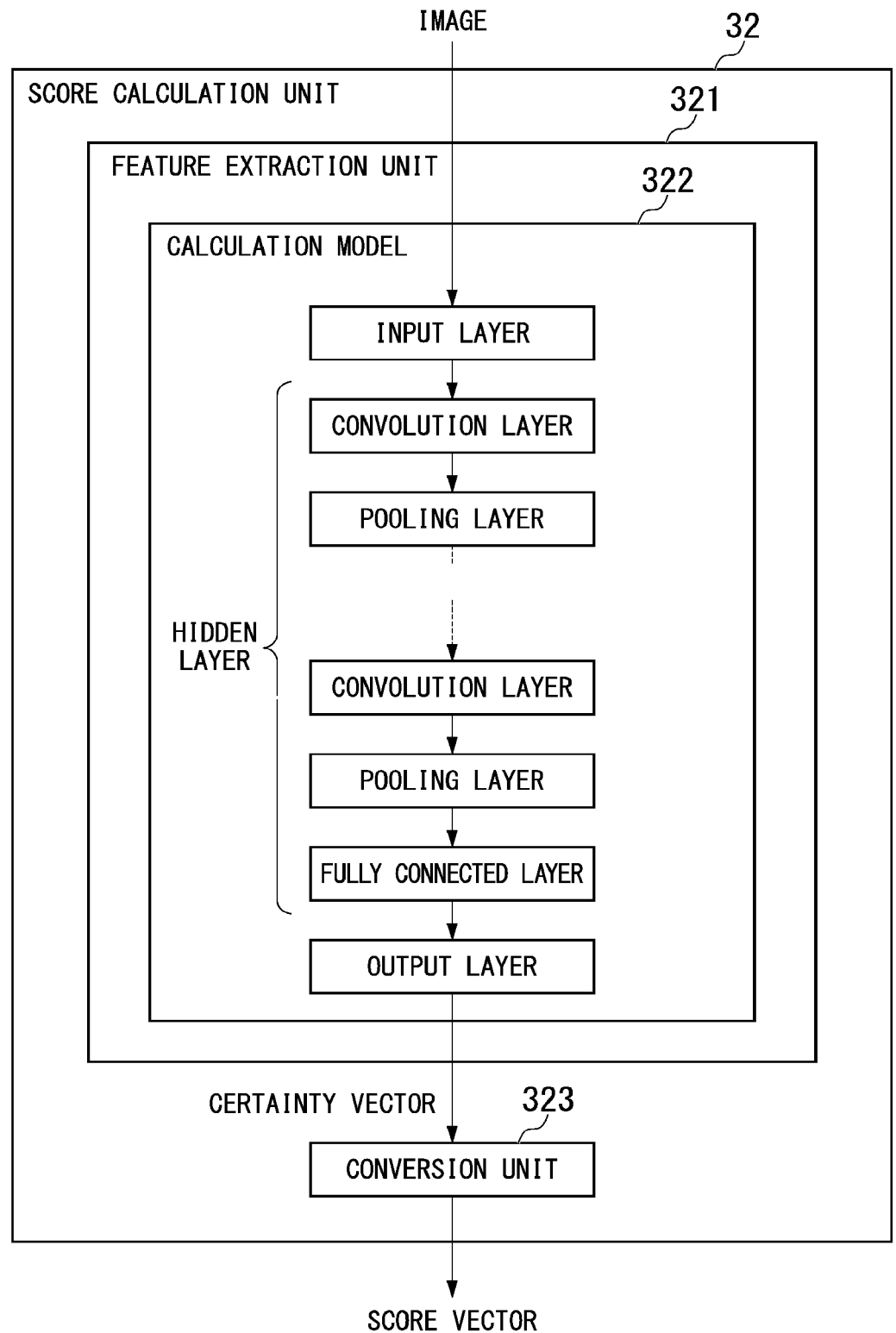
FIG. 3 is a block diagram illustrating an example of a configuration of a score calculation unit according to the first embodiment.

FIG. 3 is a block diagram illustrating an example of a configuration of the score calculation unit 32 according to the first embodiment. The score calculation unit 32 includes a feature extraction unit 321 and a conversion unit 323. The feature extraction unit 321 includes a calculation model 322 that extracts a feature of an image received from the data acquisition unit 31. A case in which a convolution neural network (CNN) is used as the calculation model 322 will be described. However, another machine learning model such as a recurrent neural network (RNN) may be used as the calculation model 322.

The calculation model 322 includes an input layer, a hidden layer, and an output layer. The hidden layer includes at least two convolution layers, a pooling layer, and a fully connected layer. The hidden layer may include two or more pooling layers and fully connected layers. The input layer receives the image input to the score calculation unit 32. The size of the input layer is determined in accordance with the number of pixels of the image and the number of channels of each pixel. The number of channels is determined in accordance with a format of the image. For example, when each pixel has a value corresponding to each of red, green, and blue, the number of channels is determined to 3.

The convolution layer performs a filtering process on an image to be input or an output (a feature map) of the pooling layer. The pooling layer reduces a size of a result (a feature map) of the filtering process by the convolution layer. The number of hidden layers, the number of convolution layers included in each hidden layer, the number of filters used in the convolution layer, the size of the filter, a stride width of the filter, and a compression size in the pooling layer are determined in advance in accordance with the size of the image to be input, a calculation processing capability of the computer included in the classification device 3, and a processing time required in the classification device 3.

The fully connected layer performs weighting addition on a plurality of feature amounts included in the feature map extracted from the image and further extracts features. The output layer calculates a value representing certainty for each quality grade from the features extracted by the fully connected layer and outputs a certainty vector in which the calculated values of certainty are set as elements. The number of elements of the certainty vector accords with the number of quality grades into which the classification system 1 classifies steel materials. As described above, the calculation model 322 calculates the certainty vector from the image.

The conversion unit 323 converts the certainty vector calculated by the calculation model 322 into a score vector. The conversion unit 323 converts each of the elements of the certainty vector into a value in a range of 0 to 1 using a sigmoid function. For example, $y=1/(1+\exp(-x))$ is used as the sigmoid function. Values obtained through the conversion become elements of the score vector, respectively. The conversion unit 323 supplies the score vector obtained through the conversion using the sigmoid function to the determination unit 33 and the classification unit 34.

Figure 4:
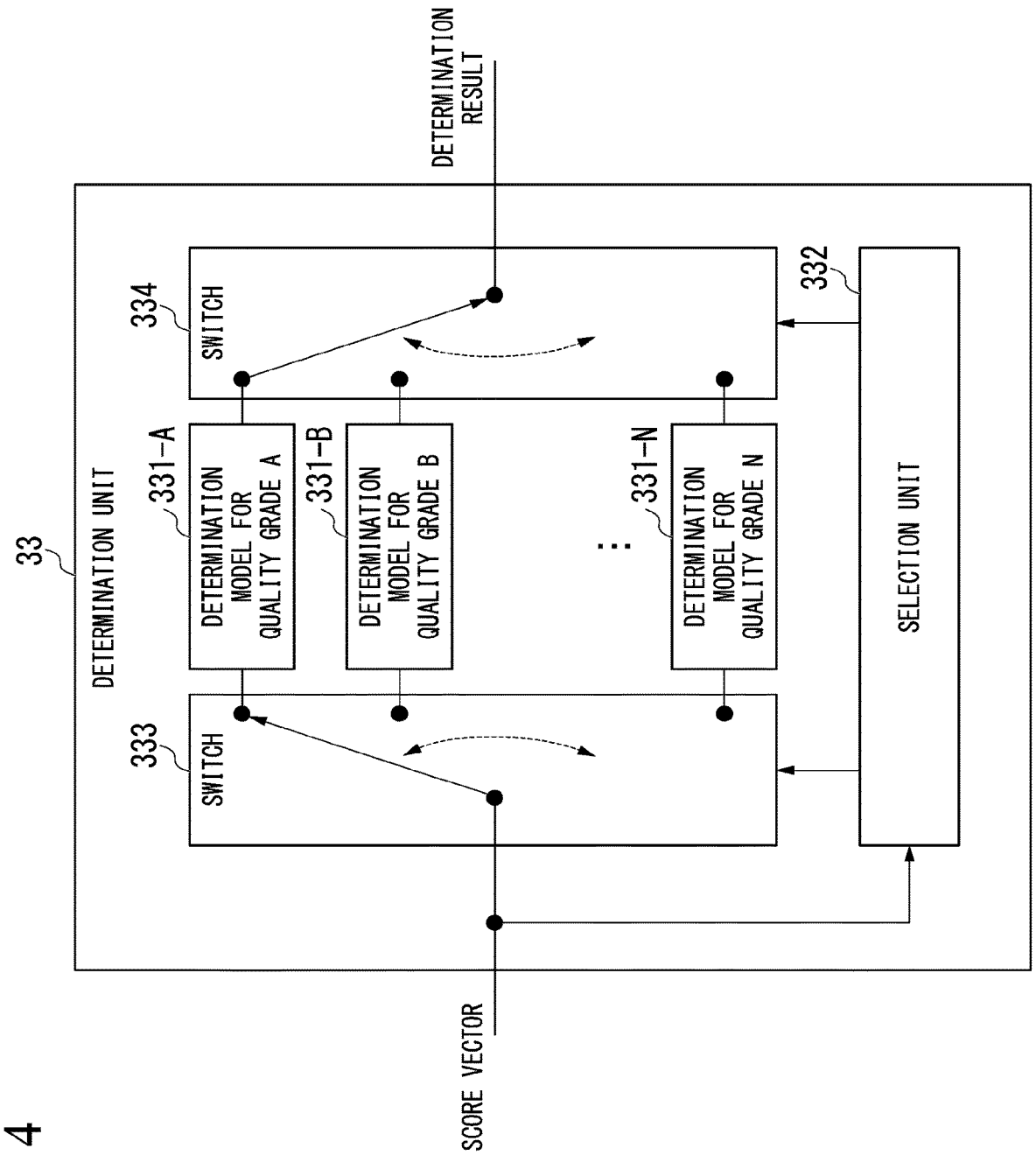
FIG. 4 is a diagram illustrating an example of a configuration of a determination unit according to the first embodiment.

FIG. 4 is a diagram illustrating an example of a configuration of the determination unit 33 according to the first embodiment. The determination unit 33 includes determination models 331 (331-A, 331-B, . . . , 331-N) corresponding to the N kinds of quality grades, a selection unit 332, and switches 333 and 334. Based on the score vector supplied from the score calculation unit 32, each one of the determination models 331 determines whether a steel material corresponding to the score vector belongs to a quality grade corresponding to the one of the determination models 331. One-class support vector machines are used as the determination models 331. For example, the determination model 331-A corresponding to quality grade A determines whether the steel material corresponding to the score vector belongs to quality grade A. When it is determined that the score vector is not an abnormal value, the determination model 331-A determines that the steel material belongs to quality grade A. When it is determined that the score vector is an abnormal value, the determination model 331-A determines that the steel material does not belong to quality grade A.

The selection unit 332 selects which determination model 331 is used among N determination models 331 corresponding to the plurality of quality grades based on the score vector. The selection unit 332 detects a largest element among the elements included in the score vector and specifies the quality grade corresponding to the detected element. The selection unit 332 selects the determination model 331 corresponding to the specified quality grade. The selection unit 332 controls the switches 333 and 334 in accordance with a selection result. The switch 333 supplies the score vector to the determination model 331 selected by the selection unit 332 under the control of the selection unit 332. The switch 334 supplies an output of the determination model 331 selected by the selection unit 332 as a determination result to the classification unit 34 under the control of the selection unit 332.

For example, a vector [0.75, 0.55, . . . , 0.18] is given as the score vector to the determination unit 33. When 0.75 is the largest value of the element, the selection unit 332 selects the determination model 331-A for quality grade A corresponding to "0.75." The determination model 331-A determines whether the score vector [0.75, 0.55, . . . , 0.18] belongs to quality grade A and outputs a determination result. When the determination model 331-A determines that the steel material belongs to quality grade A, "1" is output as a determination result. When the determination model 331-A determines that the steel material does not belong to quality grade A, "−1" is output as a determination result. The determination result "−1" indicates that the steel material belongs to an unknown quality grade.

Figure 5:
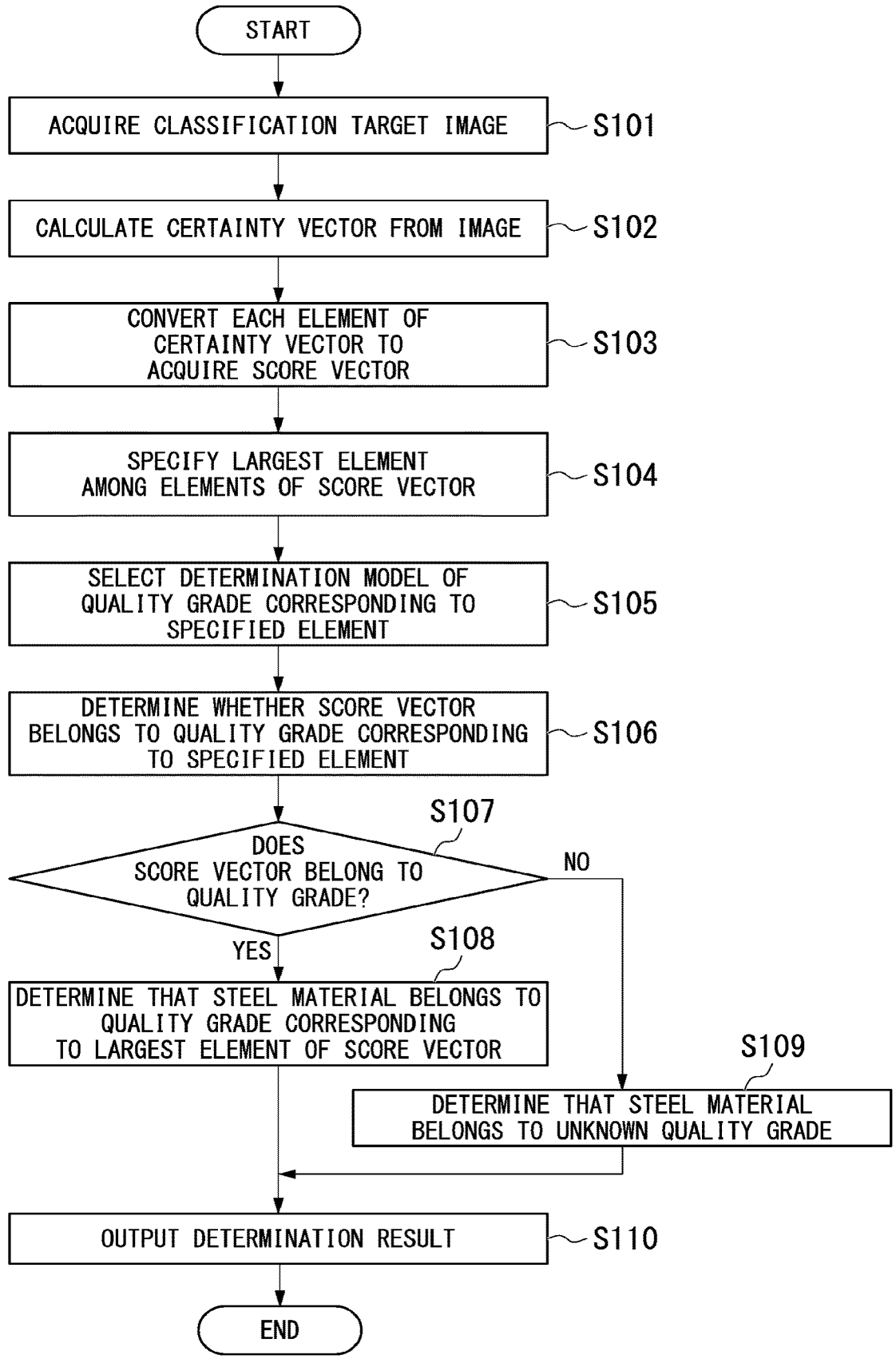
FIG. 5 is a flowchart illustrating an example of an operation of a classification process performed by the classification system according to the first embodiment.

FIG. 5 is a flowchart illustrating an example of an operation of a classification process performed by the classification system 1 according to the first embodiment. When the classification process starts in the classification system 1, the data acquisition unit 31 acquires an image obtained by imaging the sample S of a classification target steel material from the imaging device 2 (step S101). In the score calculation unit 32, the image acquired by the data acquisition unit 31 is supplied to the calculation model 322, and then the calculation model 322 calculates a certainty vector from the image (step S102). The conversion unit 323 converts each element of the certainty vector calculated by the calculation model 322 to acquire the score vector (step S103).

In the determination unit 33, the score vector supplied from the score calculation unit 32 is supplied to the selection unit 332, the selection unit 332 specifies the largest element among the elements of the score vectors (step S104), and the determination model 331 of the quality grade corresponding to the specified element is selected from the N determination models 331 (step S105). The selected determination model 331 receives the score vector via the switch 333 and determines whether the score vector belongs to the quality grade corresponding to that model (step S106). A determination result by the selected determination model 331 is supplied to the classification unit 34 via the switch 334.

When the determination result indicates that the score vector belongs to a quality standard (YES in step S107), the classification unit 34 classifies a classification target steel material as belonging to the quality grade corresponding to the largest element among the score vector elements supplied from the score calculation unit 32 and supplies a classification result to the output unit 35 (step S108). When the determination result indicates that the score vector does not belong to the quality standard (NO in step S107), the classification unit 34 classifies the classification target steel material as belonging to none of the N quality grades, classifies the classification target steel material as belonging to an unknown quality grade that is other than the N quality grades, and supplies a classification result to the output unit 35 (step S109).

The output unit 35 outputs the classification result supplied from the classification unit 34 to the display device 4, causes the display device 4 to display the classification result (step S110), and ends the classification process.

In the classification system 1, the classification process may be performed whenever the imaging device 2 images the sample S, or a plurality of images may be acquired at one time and the display device 4 may be caused to display the classification result of the steel material indicated by each image. The classification system 1 may further include a storage device and cause the storage device to store a classification result. The classification system 1 may cause the storage device to store an image of a classification target steel material and a classification result in combination.

[Learning System]

Figure 6:
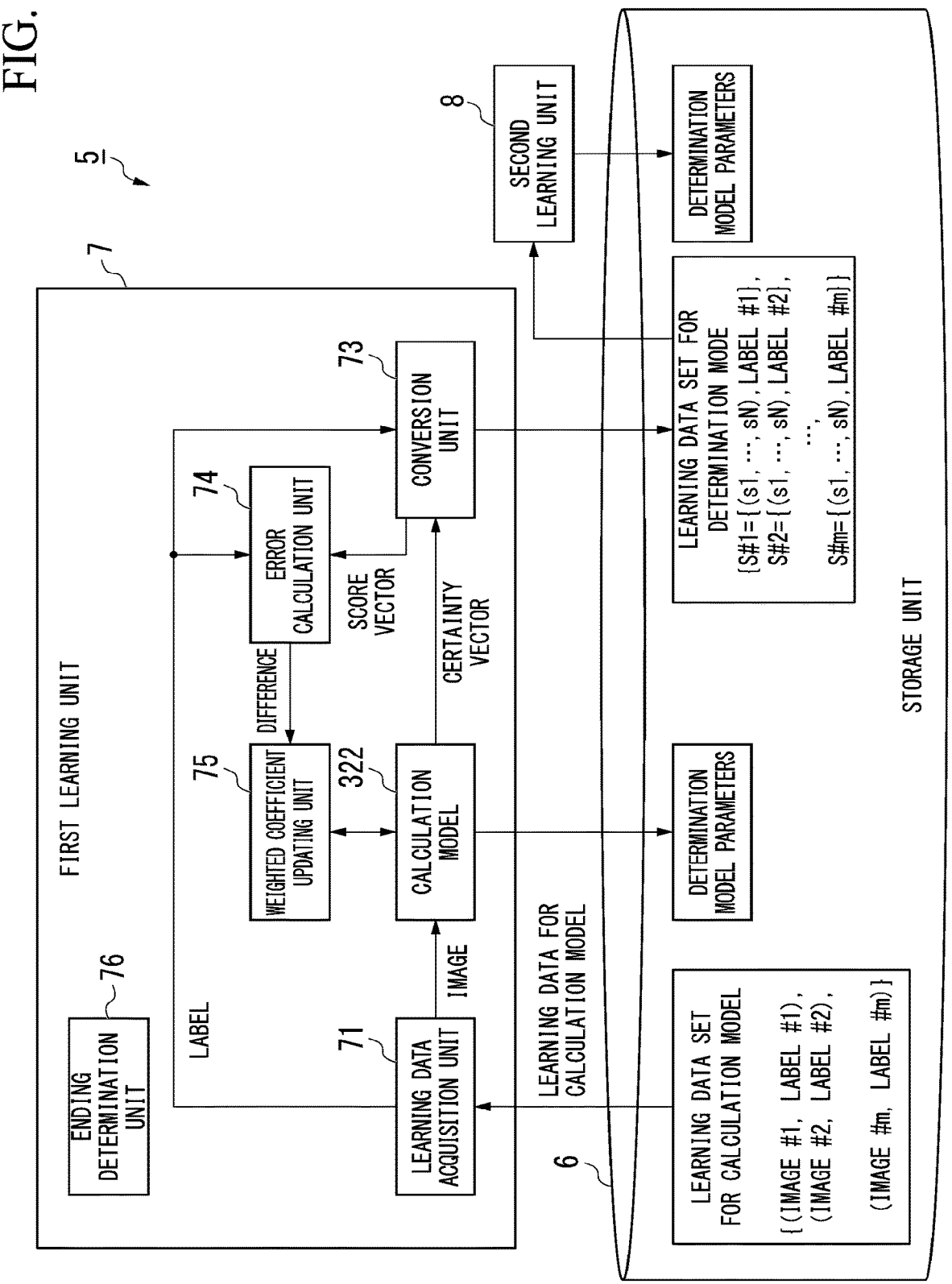
FIG. 6 is a diagram illustrating an example of a configuration of a learning system according to the first embodiment.

A learning system used to obtain the calculation model 322 and N determination models 331 used in the classification device 3 will be described. FIG. 6 is a diagram illustrating an example of a configuration of a learning system 5 according to the first embodiment. The learning system 5 includes a storage unit 6, a first learning unit 7, and a second learning unit 8. The storage unit 6 stores a training data set for a calculation model, in advance, used to train the calculation model 322. The training data set for the calculation model includes a plurality of pieces of training data including images obtained by imaging steel materials and labels indicating quality grades to which the steel materials belong.

The first learning unit 7 includes a training data acquisition unit 71, a calculation model 322, a conversion unit 73, an error calculation unit 74, a weighted coefficient updating unit 75, and an ending determination unit 76. The training data acquisition unit 71 acquires training data for a calculation model from the storage unit 6. The training data acquisition unit 71 supplies an image included in the training data for the calculation model to the calculation model 322 and supplies a label included in the training data for the calculation model to the conversion unit 73 and the error calculation unit 74.

The conversion unit 73 converts the certainty vector to be calculated from the image by the calculation model 322 into a score vector. The conversion unit 73 uses the same function as the function used by the conversion unit 323 for the conversion from the certainty vector to the score vector. The conversion unit 73 supplies the score vector to the error calculation unit 74. After the training of the calculation model 322 ends, the conversion unit 73 causes the storage unit 6 to store a combination of the score vector calculated by the calculation model 322 and the label corresponding to the image used to calculate the score vector as training data for the determination models.

The error calculation unit 74 generates a target vector from the labels supplied from the training data acquisition unit 71. The error calculation unit 74 calculates a difference between the target vector and the score vector supplied from the conversion unit 73 and supplies the calculated difference to the weighted coefficient updating unit 75. The target vector is, for example, a vector in which values of elements corresponding to the quality grades indicated by the label are set to 1 and values of the other elements are set to −1.

The weighted coefficient updating unit 75 updates weighted coefficients of the filters and a weighted coefficient of the fully connected layer in the calculation model 322 by using the error supplied from the error calculation unit 74. The weighted coefficient updating unit 75 uses a known method such as an error backpropagation for the updating of the weighted coefficients of the filters and the weighted coefficient of the fully connected layer. The weighted coefficient updating unit 75 updates the weighted coefficient whenever the training data acquisition unit 71 acquires the training data. The ending determination unit 76 determines whether the training of the calculation model 322 ends. When the ending determination unit 76 determines that the training ends, the ending determination unit 76 causes the storage unit 6 to store each weighted coefficient of the calculation model 322 as a calculation model parameter.

The second learning unit 8 determines parameters of each of the N determination models 331 by using the training data set including the plurality of pieces of the training data for the determination model stored in the storage unit 6 by the conversion unit 73. The second learning unit 8 reads the training data for the determination model including the labels indicating the same quality grades from the storage unit 6. The second learning unit 8 determines an identification boundary used to determine the score vector included in each of piece of the read training data for the determination model as a normal value. The second learning unit 8 causes the storage unit 6 to store parameters indicating the determined identification boundary as a determination model parameter. The second learning unit 8 determines the identification boundary for each of the N quality grades and determines parameters of each of the N determination models 331.

When the one-class support vector machine is used as the determination model 331, the second learning unit 8 determines a vector w and a scalar b by which a value of an identification boundary ($y=w^T S_i - b$) becomes greater than 0 with regard to all the score vectors $S_i$ (where $i=1, 2, \ldots, N$) used as normal values. Here, the number of elements of the vector w is the number (N) of quality grades and $w^T$ represents a transposition of the vector w. The second learning unit 8 determines the vector w and the scalar b for each determination model 331, that is, each quality grade.

Figure 7:
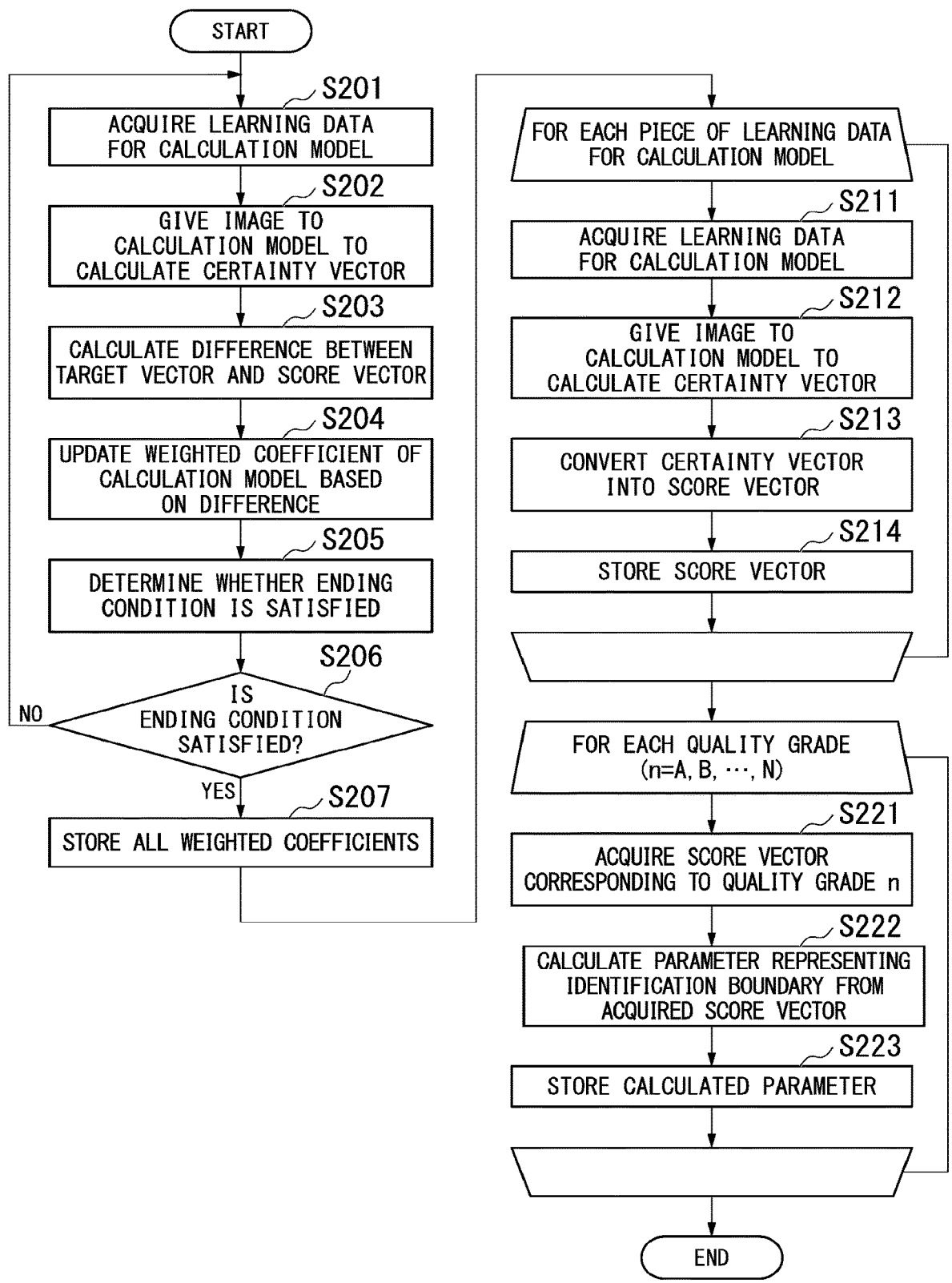
FIG. 7 is a flowchart illustrating an example of an operation of a training process performed by the learning system according to the first embodiment.

FIG. 7 is a flowchart illustrating an example of an operation of a training process performed by the learning system 5 according to the first embodiment. When the training process starts in the learning system 5, the training data acquisition unit 71 acquires the training data from the storage unit 6 (step S201). The training data acquisition unit 71 gives an image included in the acquired training data to the calculation model 322 so that the calculation model 322 calculates a certainty vector (S202). The error calculation unit 74 calculates a difference between the target vector and the score vector converted from the certainty vector by the conversion unit 73 (step S203). The weighted coefficient updating unit 75 updates each weighted coefficient of the calculation model 322 based on the difference (step S204). The ending determination unit 76 determines whether a training ending condition of the calculation model 322 is satisfied (step S205).

When the training ending condition is not satisfied (NO in step S206), the ending determination unit 76 returns the process to step S201 to continue the training of the calculation model 322. When the training ending condition is satisfied (YES in step S206), the ending determination unit 76 causes the storage unit 6 to store all the weighted coefficients included in the calculation model 322 as calculation model parameters (step S207). As the training ending condition, for example, a condition that the number of times the weighted coefficients are updated (an epoch number) reaches a predetermined number of times using all the combinations of the images and the labels included in the training data set may be used. A commonly known ending condition used in training of CNN may be used as the training ending condition.

When the training of the calculation model 322 ends, the training data acquisition unit 71 acquires the training data for the calculation model from the storage unit 6 (step S211). The training data acquisition unit 71 gives the image included in the acquired training data for the calculation model to the trained calculation model 322 so that the calculation model 322 calculates the certainty vector (step S212). The conversion unit 73 converts the certainty vector into the score vector (step S213). The conversion unit 73 causes the storage unit 6 to store the combination of the score vectors and the labels as the training data for the determination model (step S214). After the training of the calculation model 322 ends, the first learning unit 7 performs the operations of steps S211 to S214 on each piece of the training data for the calculation model included in the training data set for the calculation model. The score vector calculated from each piece of the training data for the calculation model is used as the training data for the determination model.

When the training data set for the determination model is obtained from the training data set for the calculation model by repeating the operations of steps S211 to S214, the second learning unit 8 acquires a set of the score vectors corresponding to every quality grade n (where n=A, B, . . . , N) from the storage unit 6 (step S221). The second learning unit 8 calculates parameters indicating an identification boundary in one-class support vector machine serving as the determination model 331 from the acquired set of the score vectors (step S222). The second learning unit 8 causes the storage unit 6 to store the calculated parameters as parameters of the determination model 331 corresponding to the quality grade n (step S223). The second learning unit 8 performs the operations of steps S221 to S223 on each of quality grade A to quality grade N. The parameters indicating the identification boundary calculated from the set of the score vectors of each quality grade can be obtained as the parameter of the determination model 331 corresponding to each quality grade.

When the parameters of the determination model 331 corresponding to each quality grade are stored in the storage unit 6, the second learning unit 8 ends the training process.

By applying the calculation model parameter and the determination model parameters stored in the storage unit 6 to the calculation model 322 and the determination models 331, respectively, included in the classification device 3, it is possible to obtain each model in which the training result is reflected. After the calculation model parameter and the determination model parameters are applied to the calculation model 322 and the determination models 331, respectively, the classification process is performed in the classification system 1.

The classification system 1 according to the first embodiment includes the determination model 331 of each quality grade obtained through the training process and classifies a steel material by using a determination result of the determination model 331 corresponding to the most certain quality grade indicated by the score vector. By performing such classification, the classification system 1 can avoid wrong classification on the steel material even when an image of the steel material belonging to none of the quality grades is given, and thus it is possible to curb deterioration in the classification precision.

The conversion unit 323 can independently convert each of the elements included in the certainty vector using the sigmoid function to obtain the score vector, so that precision of prediction of the most certain quality grade to which the steel material belongs can be improved. The conversion unit 73 calculates the training data for the determination model used to train the determination model 331 using the sigmoid function as in the conversion unit 323, and thus the determination model 331 corresponding to each quality grade can be determined without receiving an influence of the other quality grades. In this way, by determining each determination model 331, it is possible to improve determination precision of whether the score vector is an abnormal value. That is, the classification system 1 can classify whether the steel material belongs to an unknown quality grade with high precision, and thus it is possible to curb deterioration in the classification precision of the classification system 1.

The determination unit 33 selects the determination model 331 used for the determination from the plurality of determination models 331 based on the largest element (score) among the elements of the score vector. Therefore, it is possible to improve the determination precision of whether the steel material corresponding to the score vector belongs to the quality grade. Additionally, it is possible to curb deterioration in the classification precision of the classification system 1.

By using one-class support vector machine as the determination model 331, the determination model 331 can be trained even when an abnormal value is not prepared as the training data for the determination model, and thus it is possible to reduce a burden of the preparation of the training data on a user who uses the classification system 1. Since the training data for the determination model is calculated from the training data set for the calculation model used to train the calculation model 322, it is possible to further reduce the burden of the preparation of the training data on the user using the classification system 1.

Even when it is difficult to prepare the image of the steel material to be classified as a defective product in the determination of the quality grades as training data, the classification system 1 can output a classification result in which the steel material to be classified as a defective product belongs to none of the quality grades. Accordingly, even when the classification system 1 does not prepare an image of the steel material to be classified as a defective product as training data, it is possible to output a classification result in which a defective product belongs to an unknown quality grade, and thus it is possible to detect a defective product.

By using the score vector corresponding to each quality grade among the score vectors calculated from the training data set for the calculation model in the training of the determination model 331, training in consideration of an abnormal value is not necessary, and thus it is possible to improve the determination precision of the determination model 331. It is possible to reduce a calculation load when the second learning unit 8 determines parameters of the determination model 331.

Second Embodiment

Figure 8:
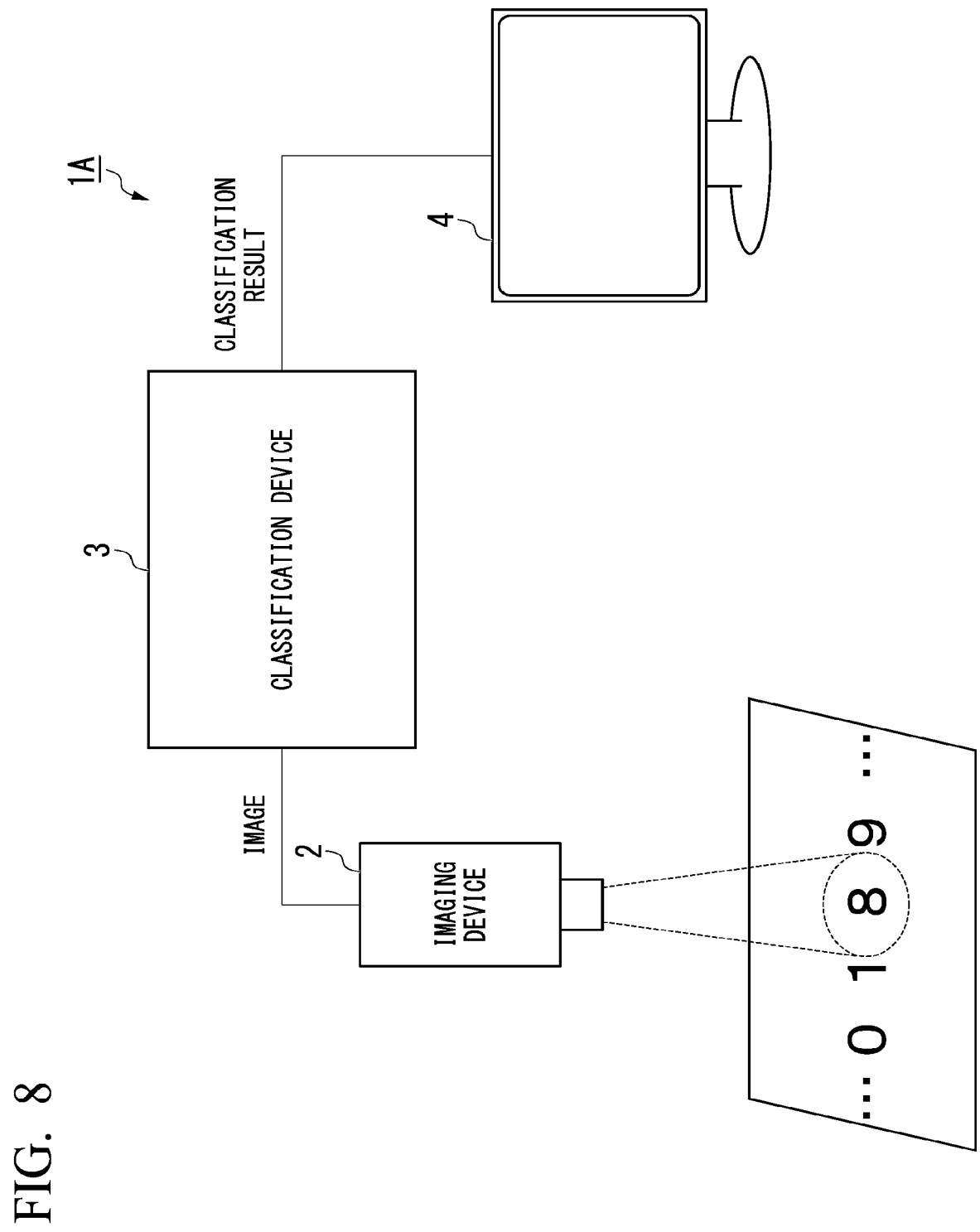
FIG. 8 is a diagram illustrating an example of a configuration of a classification system according to a second embodiment.

FIG. 8 is a diagram illustrating an example of a configuration of a classification system 1A according to the second embodiment. The classification system 1A determines whether a handwritten letter is one of numbers (0, 1, 2, ..., 9) to classify the letter. When the letter is a letter other than a number, the classification system 1A classifies the letter as a letter which is not a number. As in the classification system 1 according to the first embodiment, the classification system 1A includes the imaging device 2, the classification device 3, and the display device 4. The imaging device 2 images a letter and supplies the obtained image as input data to the classification device 3. The classification device 3 determines whether the letter corresponds to one of 0 to 9 by using the trained calculation model 322 and the determination model 331 and classifies the letter. In the second embodiment, each of "0" to "9" is an example of a class. The classification device 3 outputs a classification result indicating that the letter is one of 0 to 9 to the display device 4 and causes the display device 4 to display the classification result. When the letter is none of 0 to 9, the classification device 3 outputs a classification result indicating that the letter is not a number to the display device 4.

In the classification system 1A according to the second embodiment, a training data set for a calculation model in training of the calculation model 322 and the determination model 331 differs from a training data set for the calculation model according to the first embodiment. Each piece of training data included in the training data set for the calculation model includes a combination of an image indicating a letter which is one of 0 to 9 and a label indicating the number indicated by the image. The number included in the image may be not only a handwritten number but also a number obtained in accordance with any technique.

Figure 9:
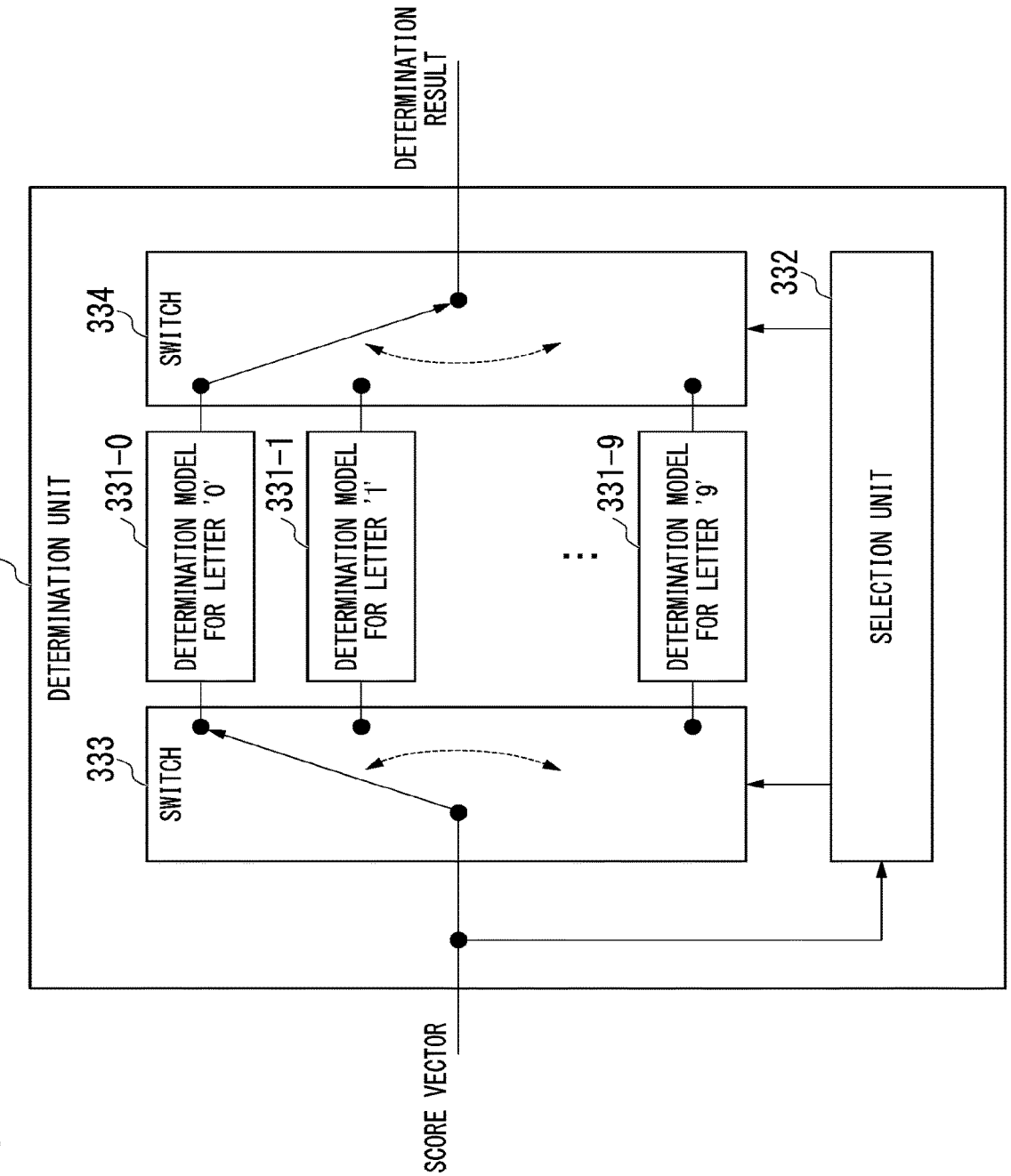
FIG. 9 is a diagram illustrating an example of a configuration of a determination unit according to the second embodiment.

Since a configuration of the determination unit 33 in the classification system 1A according to the second embodiment differs from the configuration of the determination unit 33 according to the first embodiment, the configuration of the determination unit 33 will be described and the other description will be omitted. FIG. 9 is a diagram illustrating an example of a configuration of the determination unit 33 according to the second embodiment. The determination unit 33 includes determination models 331 (331-0, 331-1, 331-2, . . . , 331-9) corresponding to numbers of 0 to 9, the selection unit 332, and switches 333 and 334. While the determination unit 33 according to the first embodiment includes the determination model 331 of each quality grade, the determination unit 33 according to the second embodiment includes the determination models 331 corresponding to the numbers of 0 to 9.

The selection unit 332 selects a determination model 331 to be used among ten determination models 331 corresponding to the numbers of 0 to 9 based on a score vector calculated from an image indicating a letter. A standard for selecting the determination model 331 according to the second embodiment is similar to the standard in the first embodiment and the determination model 331 corresponding to the largest element among the elements included in the score vector is selected.

The training of the calculation model 322 and the determination models 331 included in the classification system 1A according to the second embodiment is performed by the same learning system as the learning system 5 according to the first embodiment. In the second embodiment, each piece of training data included in the training data set for the calculation model includes a combination of an image obtained by imaging one of the numbers of 0 to 9 and a label indicating the captured number in the image. By using the calculation model 322 and the determination models 331 trained using the training data set for the calculation model, the classification system 1A can avoid wrong classification of a letter even when the letter included in the image includes a letter other than a number, as in the classification of the quality grades of steel materials. Thus, it is possible to curb deterioration of classification precision. When the classification system 1A acquires an image including a letter other than a number as input data, the classification system 1A can classify the letter included in the image as an unknown letter other than a number.

Modification Examples

In the first embodiment, the classification system 1 that classifies the quality grades of steel materials has been described. In the second embodiment, the classification system 1A that classifies whether a letter is one of letters of 0 to 9 has been described. In the first and second embodiments, the cases in which an image obtained by imaging a classification target is used as input data have been described, but the classification target input data may be sensor data or acoustic data including a measurement value measured by a sensor. As the sensor acquiring the sensor data, a pressure sensor, a temperature sensor, a humidity sensor, an optical sensor, an ultrasonic sensor, a weighting sensor, or the like may be used. Even when sensor data or acoustic data is acquired as input data, a classification system according to an embodiment can output a classification result indicating a class to which the input data belongs to and a classification result indicating that the input data belongs to an unknown class. Even when the sensor data or the acoustic data is acquired as input data, the classification system can curb deterioration in classification precision.

For example, the classification system receives data obtained by a sensor equipped in a product manufacturing line as an input and determines whether a product is a defective product based on the data. Further, when the classification system determines that the product is a defective product, the classification system classifies a kind of defective product. When a welding process is included in the manufacturing line, the classification system receives measurement values of a pressure and a temperature acquired by a pressure sensor and a temperature sensor as inputs and determines whether a product is a defective product. Further, when the classification system determines that the product is a defective product, the classification system classifies a kind of defective product. For example, the classification system classifies a crack or a poor weld of a product as the kind of defect. The classification system classifies a defect which can be classified into neither the crack nor the poor weld of the product as an unknown defect. By applying the classification system to the manufacturing line, it is possible to determine presence or absence of a defect which is difficult to detect through only inspection of the outer appearance of the product. Since the classification system detects a case in which an unknown defect occurs in a product, the kind of defect can be classified with high precision.

In the first and second embodiments, the cases in which the conversion unit 323 uses the sigmoid function in the conversion of each element of the certainty vector have been described, but a hyperbolic tangent function ($y=\tanh(x)$), an ReLU function (ramp function), or a linear function may be used. The conversion unit 323 may use another function in conversion into a score vector to be supplied to the determination unit 33 and conversion into a score vector to be supplied to be classification unit 34. For example, the conversion unit 323 may use a sigmoid function in the conversion into the score vector to be supplied to the determination unit 33 and use a Softmax function in the conversion into the score vector to be supplied to the classification unit 34.

The configurations in which the classification systems 1 and 1A according to the first and second embodiments include the imaging device 2 have been described. However, the classification systems 1 and 1A may include a storage device and a communication device supplying an image as input data to the classification device 3 instead of the imaging device 2.

According to at least one of the above-described embodiments, the classification system includes the determination unit 33 that determines whether the input data belongs to one of the classes based on the score of each class calculated by the score calculation unit 32, and the classification unit 34 that determines the class to which the input data belongs based on the calculated score of each class when the determination unit 33 determines that the input data belongs to one of the classes and determines that the input data belongs to an unknown class when the determination unit 33 determines that the input data belongs to none of the classes. Even when the input data which belongs to none of the classes is given, it is possible to avoid wrong classification of the input data. Thus, it is possible to curb deterioration in the classification precision.

While preferred embodiments have been described and illustrated above, these embodiments have been presented by way of example only, and are not intended to limit the scope of the invention. Indeed, the novel embodiments described herein may be embodied in a variety of other form; furthermore, various omissions, substitutions and changes in the form of the embodiments described herein may be made without departing from the scope of the inventions. The accompanying claims and their equivalents are intended to cover such forms or modifications as would fall within the scope of the inventions.

We claim:

1. A classification system comprising:
a score calculation unit configured to calculate respective scores of predetermined classes from input data;
a determination unit configured to determine whether the input data belongs to anyone of the classes, based on the respective scores of the classes, which are calculated by the score calculation unit; and
a classification unit configured to determine to which one of the classes the input data belongs, based on the respective scores when the determination unit determines that the input data belongs to anyone of the classes, and to determine that the input data belongs to an unknown class that is other than the classes when the determination unit determines that the input data does not belong to the classes,
wherein the determination unit includes:
trained determination models, corresponding to respective classes, configured to determine whether a vector including the respective scores of the classes belongs to a corresponding class; and
a selection unit configured to supply a vector including the respective scores, which are calculated from the input data, to one of the determination models corresponding to the class with the largest score among the respective scores of the classes, which are calculated by the score calculation unit, and
wherein a determination result by the one of the determination models, to which the vector is supplied, is supplied to the classification unit.

2. The classification system according to claim 1, wherein the score calculation unit comprises:
a trained calculation model configured to calculate a first value which represents a respective certainty of each of the classes from the input data, and
a conversion unit configured to convert the first value of each of the classes calculated by the calculation model into a second value within a predetermined range by using a sigmoid function and outputs, as each of the calculated scores, each second value into which the first value of each of the classes is converted.

3. The classification system according to claim 1, wherein the determination unit determines whether the input data belongs to one of the classes, based on the largest score among the respective scores of the classes, which are calculated by the score calculation unit.

4. The classification system according to claim 1, wherein the determination unit includes one-class support vector machines as the determination models.

5. The classification system according to claim 1,
wherein each one of the determination models that correspond to the respective classes is obtained through training using a set of vectors,
wherein each vector included in the set of vectors includes, as elements, respective scores to the classes, which are calculated by the score calculation unit, and
wherein each vector included in the set of vectors has, as one of the elements, a score corresponding to a class of the one of the determination models, and the score is higher than the other scores.

6. A non-transitory computer-readable medium storing a program for causing a computer provided in a classification system to function as:
a score calculation unit configured to calculate respective scores of predetermined classes from input data;
a determination unit configured to determine whether the input data belongs to anyone of the classes, based on the respective scores of the classes, which are calculated by the score calculation unit; and
a classification unit configured to determine to which one of the classes the input data belongs, based on the respective scores when the determination unit determines that the input data belongs to anyone of the classes, and to determine that the input data belongs to an unknown class that is other than the classes when the determination unit determines that the input data does not belong to the classes,
wherein the determination unit includes:
trained determination models, corresponding to respective classes, configured to determine whether a vector including the respective scores of the classes belongs to a corresponding class; and
a selection unit configured to supply a vector including the respective scores, which are calculated from the input data, to one of the determination models corresponding to the class with the largest score among the respective scores of the classes, which are calculated by the score calculation unit, and
wherein a determination result by the one of the determination models, to which the vector is supplied, is supplied to the classification unit.

* * * * *